(12) United States Patent
Stebbins et al.

(10) Patent No.: US 12,521,333 B2
(45) Date of Patent: Jan. 13, 2026

(54) COMPOSITION COMPRISING COMPOUND OF THIOPYRIDINONE TYPE AND POLYGLYCERYL-BASED EMULSIFIERS

(71) Applicant: L'OREAL, Paris (FR)

(72) Inventors: Nicholas David Stebbins, Rahway, NJ (US); David Chan, Oradell, NJ (US); Susan Halpern, Basking Ridge, NJ (US)

(73) Assignee: L'OREAL, Paris (FR)

( * ) Notice: Subject to any disclaimer, the term of this patent is extended or adjusted under 35 U.S.C. 154(b) by 46 days.

(21) Appl. No.: 17/844,949

(22) Filed: Jun. 21, 2022

(65) Prior Publication Data

US 2023/0404882 A1 Dec. 21, 2023

(51) Int. Cl.
*A61K 8/49* (2006.01)
*A61K 8/06* (2006.01)
*A61K 8/37* (2006.01)
*A61K 8/67* (2006.01)
*A61Q 19/02* (2006.01)

(52) U.S. Cl.
CPC ............ *A61K 8/4926* (2013.01); *A61K 8/062* (2013.01); *A61K 8/375* (2013.01); *A61K 8/675* (2013.01); *A61Q 19/02* (2013.01)

(58) Field of Classification Search
CPC ........ A61K 8/062; A61K 8/4933; A61K 8/37; A61Q 19/00
See application file for complete search history.

(56) References Cited

U.S. PATENT DOCUMENTS

| | | | |
|---|---|---|---|
| 5,466,719 A * | 11/1995 | Jakobson | A61K 8/922 554/173 |
| 2013/0315847 A1* | 11/2013 | Marat | A61K 8/4926 424/59 |
| 2021/0401715 A1 | 12/2021 | Faig et al. | |

FOREIGN PATENT DOCUMENTS

| | | |
|---|---|---|
| CN | 106074663 B | 8/2019 |
| WO | 2012080075 A1 | 6/2012 |
| WO | 20220138471 A1 | 6/2022 |

OTHER PUBLICATIONS

Sikora (Cracow University of Technology, Cosmetic Emulsions, https://repozytorium.biblos.pk.edu.pl/redo/resources/41516/file/suwFiles/SikoraE_CosmeticEmulsions.pdf, 2019, pp. 1-117) (Year: 2019).*
Cornwell et al (International Journal of Pharmaceutics, 1998, vol. 171, pp. 243-255) (Year: 1998).*
Cosmetic Ingredient Review (herein as CIR) (Safety Assessment of Polyglyceryl Fatty Acid Esters as Used in Cosmetics, Release Date Mar. 2016, 249 pages, https://www.cir-safety.org/sites/default/files/polyglyceryl%20fatty%20acid.pdf) (Year: 2016).*
Search Report of corresponding application FR 2211482, mailed Jun. 28, 2023, 2 pages.

* cited by examiner

*Primary Examiner* — Mark V Stevens
(74) *Attorney, Agent, or Firm* — Laetitia Leproust; Robert Klemz

(57) ABSTRACT

An oil-in-water cosmetic composition comprising: compound of thipyridinone type; one or more Polyglyceryl Fatty Acid Ester; an oil phase; and wherein the oil-in-water cosmetic composition is a macroemulsion and wherein the compound of thipyridinone type penetrates rapidly and in a high amount.

15 Claims, 4 Drawing Sheets

COMPOSITION COMPRISING COMPOUND OF THIOPYRIDINONE TYPE AND POLYGLYCERYL-BASED EMULSIFIERS

FIELD OF THE INVENTION

Cosmetic compositions providing enhanced penetration of actives into skin are provided along with methods of use related thereto.

BACKGROUND OF THE INVENTION

There have been a wide variety of skin care active ingredients used in the field of cosmetics and dermatological compositions.

It is preferable for skin care active ingredients to be absorbed by the skin or penetrated into the skin as much as possible. However, skin absorption or skin penetration of such skin care active ingredients is not easy due to the barrier function of the skin. Thus, one possible approach to enhance the skin penetration of a skin care active ingredient may be to use a skin penetration enhancer with the skin care active ingredient.

SUMMARY OF THE DISCLOSURE

The instant disclosure relates to cosmetic compositions that provide enhanced penetration of compound of thiopyridinone type (I) or (I') into skin by using Polyglyceryl Fatty Acid Esters.

The inventors have discovered that the combination of compound of thioprydinone type (I) or (I') with some polyglyceryl Fatty Acid Esters would enhance the penetration of the compound of thioprydinone type and would also contribute to a rapid penetration compare to compositions using know penetration enhancers.

The oil-in-water cosmetic compositions typically include:
  i) at least one compound selected from compounds of formula (I) and tautomer of formula (I') herein below; and their optical isomers, racemates, and/or solvates such as hydrates, alone or as a mixture:

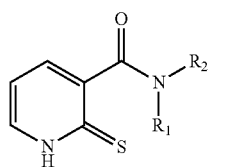

(I)

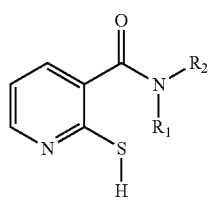

(I')

In which Formulas (I) and (I'):
  $R_1$ denotes a radical chosen from:
    a) a hydrogen atom;
    b) a saturated linear $C_1$-$C_{10}$ or branched $C_3$-$C_{10}$ alkyl group optionally substituted with one or more groups, which may be identical or different, chosen from:
      i) —O—$R_3$
      ii) —S—$R_3$;
  $R_2$ denotes a radical chosen from:
    a) a hydrogen atom;
    b) a saturated hydrocarbonated group linear $C_1$-$C_{12}$ or branched $C_3$-$C_{12}$ or cyclic $C_3$-$C_8$, optionally substituted with one or more groups, which may be identical or different, chosen from:
      i) —O—$R_3$
      ii) —S—$R_3$
      iii) —C(O)—O—$R_3$;
      iv) a $C_5$-$C_{12}$ aryl group optionally substituted with one or more hydroxyls and/or with one or more $C_1$-$C_8$ alkoxy radicals;
    c) a $C_5$-$C_{12}$ aryl group optionally substituted with one or more hydroxyls and/or with one or more $C_1$-$C_8$ alkoxy radicals
  $R_3$ denotes a radical chosen from:
    a) a hydrogen atom;
    b) a saturated linear $C_1$-$C_{10}$ or branched $C_3$-$C_{10}$ alkyl group;
  ii) one or more Polyglyceryl Fatty Acid Ester;
  iii) one or more oil; and
    wherein the oil-in-water cosmetic composition is a macroemulsion.

In some embodiments, the penetration of the i) compound of thiopyridinone type is rapid and enhanced. In various embodiments, the composition provides enhanced penetration of the i) compound of thiopyridinone type in an in vitro penetration test.

In some embodiments, the i) compound of thiopyridinone type has a log P value ranging from about −1.5 to about 1.5.

In some embodiments, the composition is in the form of an oil-in-water macroemulsion. In various embodiments, the penetration of the i) compound of thiopyridinone type is improved through the use of one or more Polyglyceryl Fatty Acid Esters. In one or more embodiments, the i) compound of thiopyridinone type is present from about 0.01 to about 10 wt. %, based on the total weight of the cosmetic composition. In some embodiments, the i) compound of thiopyridinone type is present from about 0.1 to about 5 wt. %, based on the total weight of the cosmetic composition. In some embodiments, the i) compound of thiopyridinone type is present from about 0.5 to about 3 wt. %, based on the total weight of the cosmetic composition.

In some embodiments, the one or more Polyglyceryl Fatty Acid Ester have an HLB from about 8 to about 20. In various embodiments, the polyglyceryl fatty acid esters has a polyglyceryl moiety derived from 2 to 10 glycerins, preferably 2 to 8 glycerins, and more preferably from 2 to 6 glycerins. In one or more embodiments, the one or more polyglyceryl fatty acid ester is chosen from polyglyceryl monolaurate comprising 2 to 6 glycerol units, polyglyceryl monocaprate comprising 2 to 6 glycerol units, polyglyceryl monooleate comprising 2 to 6 glycerol units, and polyglyceryl distearate comprising 2 to 6 glycerol units. In some embodiments, the one or more polyglyceryl fatty acid esters is selected from the group consisting of polyglyceryl-4 caprate, polyglyceryl-6 dicaprate, polyglyceryl-6 dioleate, polyglyceryl-6 distearate, and mixtures thereof. In one or more embodiments, the one or more polyglyceryl fatty acid esters is present from about 0.5 to about 3 wt. %, based on the total weight of the cosmetic composition.

In some embodiments, the oil phase is present from about 2 to about 25 wt. %, based on the total weight of the cosmetic composition. In various embodiments, the one or more oil is chosen from ester oils, hydrocarbon oils, fatty alcohols, fatty ethers, carbonates, silicone oils and mixtures thereof.

In one or more embodiments, the cosmetic composition may have a pH ranging from about 4.5 to about 6.5, preferably from about 5 to about 6.

In some embodiments, the oil-in-water cosmetic compositions may include:
i) from about 0.01 to about 10 wt. % of at least one compound selected from compounds of formula (I) and tautomer of formula (I') herein below; and their optical isomers, racemates, and/or solvates such as hydrates, alone or as a mixture:

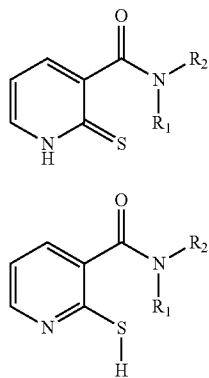

In which Formulas (I) and (I')
$R_1$ denotes a radical chosen from:
  a) a hydrogen atom;
  b) a saturated linear $C_1$-$C_{10}$ or branched $C_3$-$C_{10}$ alkyl group optionally substituted with one or more groups, which may be identical or different, chosen from:
    i) —O—$R_3$
    ii) —S—$R_3$;
$R_2$ denotes a radical chosen from:
  a) a hydrogen atom;
  b) a saturated hydrocarbonated group linear $C_1$-$C_{12}$ or branched $C_3$-$C_{12}$ or cyclic $C_3$-$C_8$, optionally substituted with one or more groups, which may be identical or different, chosen from:
    i) —O—$R_3$
    ii) —S—$R_3$
    iii) —C(O)—O—$R_3$;
    iv) a $C_5$-$C_{12}$ aryl group optionally substituted with one or more hydroxyls and/or with one or more $C_1$-$C_8$ alkoxy radicals;
  c) a $C_5$-$C_{12}$ aryl group optionally substituted with one or more hydroxyls and/or with one or more $C_1$-$C_8$ alkoxy radicals
$R_3$ denotes a radical chosen from:
  a) a hydrogen atom;
  b) a saturated linear $C_1$-$C_{10}$ or branched $C_3$-$C_{10}$ alkyl group;
ii) about 0.5 to about 3 wt. % of one or more Polyglyceryl Fatty Acid Ester with a HLB from about 8 to about 20;
iii) one or more oil; and
  wherein the oil-in-water cosmetic composition is a macroemulsion and wherein the penetration of the i) compound of thiopyridinone type is rapid and enhanced.

The instant disclosure relates to methods of using the cosmetic composition, comprising applying the cosmetic composition of the instant disclosure to a skin surface, wherein the cosmetic composition provides enhanced penetration of the compound of thiopyridinone type into skin.

Another aspect of the instant disclosure is methods of increasing the percentage of the compound of thiopyridinone type deposited in skin, the method comprising topically applying the cosmetic composition of the instant disclosure to skin, wherein the cosmetic composition of the instant disclosure increases the percentage of the compound of thiopyridinone type deposited in the skin.

These and other aspects of the invention are set out in the appended claims and described in greater detail in the detailed description of the invention.

This disclosure describes exemplary embodiments in accordance with the general inventive concepts and is not intended to limit the scope of the invention in any way. Indeed, the invention as described in the specification is broader than and unlimited by the exemplary embodiments set forth herein, and the terms used herein have their full ordinary meaning.

Figure 1:
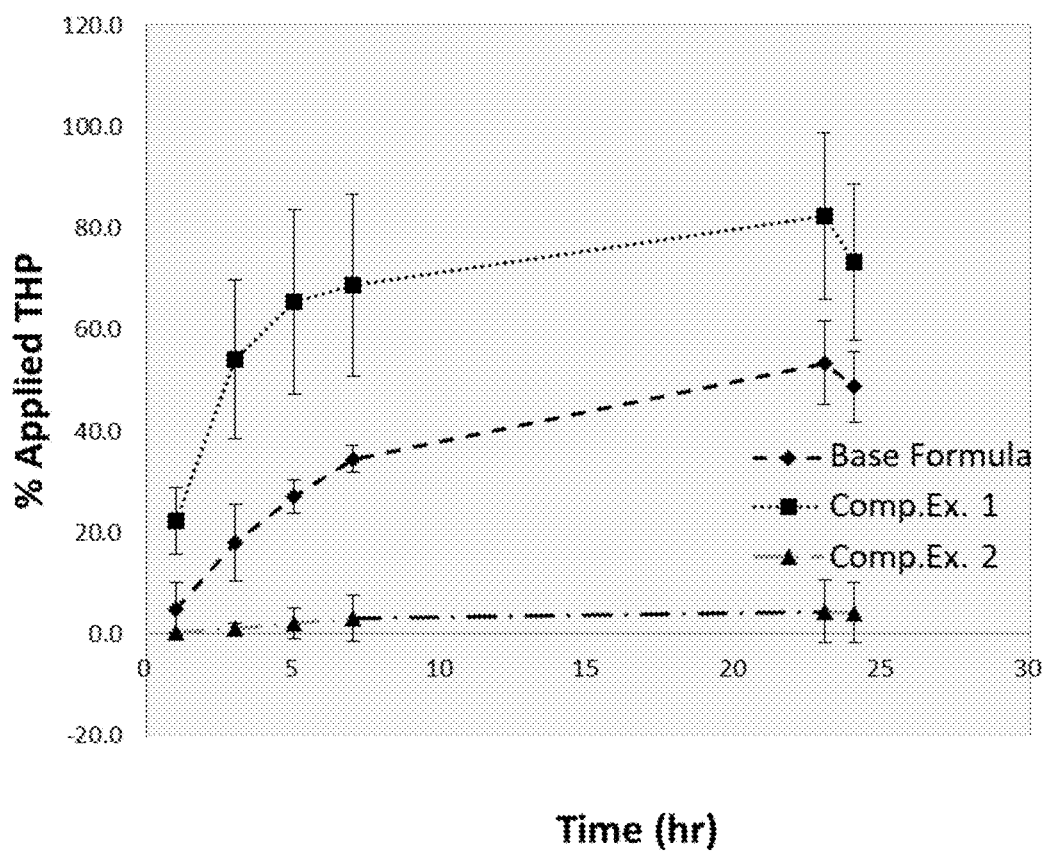
FIG. 1 is a graph showing the percentage of applied compound of thiopyridinone type (THP) penetration for Base Formula and Comparative Examples.

It should be understood that the various aspects of the present disclosure are not limited to the arrangements and instrumentality shown in the figures.

DETAILED DESCRIPTION OF THE DISCLOSURE

The present disclosure relates to cosmetic compositions typically including at least one compound corresponding to the following formula (I) or (I'), referred to as "compound of thiopyridinone type".

The instant disclosure relates to cosmetic compositions that provide enhanced penetration of compound of thioprydinone type into skin by using Polyglyceryl Fatty Acid Esters.

The inventors have discovered that the combination of compound of thioprydinone type with some polyglyceryl Fatty Acid Esters would enhance the penetration of the compound of thioprydinone type and would also contribute to a rapid penetration compared to compositions using know penetration enhancers.

The oil-in-water cosmetic compositions typically include:
  i) at least one compound selected from compounds of formula (I) and tautomer of formula (I') herein below; and their optical isomers, racemates, and/or solvates such as hydrates, alone or as a mixture

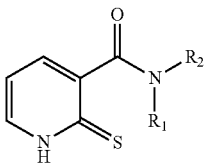

(I)

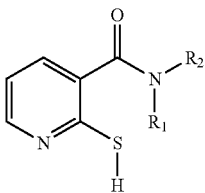

(I')

In which Formulas (I) and (I')
R$_1$ denotes a radical chosen from:
  a) a hydrogen atom;
  b) a saturated linear C$_1$-C$_{10}$ or branched C$_3$-C$_{10}$ alkyl group optionally substituted with one or more groups, which may be identical or different, chosen from:
    i) —O—R$_3$
    ii) —S—R$_3$;
R$_2$ denotes a radical chosen from:
  a) a hydrogen atom;
  b) a saturated hydrocarbonated group linear C$_1$-C$_{12}$ or branched C$_3$-C$_{12}$ or cyclic C$_3$-C$_8$, optionally substituted with one or more groups, which may be identical or different, chosen from:
    i) —O—R$_3$
    ii) —S—R$_3$
    iii) —C(O)—O—R$_3$;
    iv) a C$_5$-C$_{12}$ aryl group optionally substituted with one or more hydroxyls and/or with one or more C$_1$-C$_8$ alkoxy radicals;
  c) a C$_5$-C$_{12}$ aryl group optionally substituted with one or more hydroxyls and/or with one or more C$_1$-C$_8$ alkoxy radicals
  R$_3$ denotes a radical chosen from:
  a) a hydrogen atom;
  b) a saturated linear C$_1$-C$_{10}$ or branched C$_3$-C$_{10}$ alkyl group;
ii) one or more Polyglyceryl Fatty Acid Ester;
iii) one or more oil; and Cosmetic formulations comprising compounds of thiopyridinone type, one or more Polyglyceryl Fatty Acid Esters and one or more oils that are appropriate for topical application to the skin include compositions in the form of oil-in-water macroemulsions.

Compounds of Thiopyridinone Type

For the purposes of the instant disclosure, and unless otherwise indicated:
  a "saturated hydrocarbonated group linear C$_1$-C$_{12}$ or branched C$_3$-C$_{12}$" is equivalent to a "linear (C$_1$-C$_{12}$) alkyl or branched (C$_3$-C$_{12}$)alkyl group" which correspond to a saturated C$_1$-C$_{12}$ linear or branched C$_3$-C$_{12}$ hydrocarbon based group, and preferably C$_1$-C$_{10}$ linear or C$_3$-C$_{10}$ branched hydrocarbon based group, more preferably C$_1$-C$_6$ linear or C$_3$-C$_6$ branched hydrocarbon-based; Preferentially, the linear or branched groups may be chosen from methyl, ethyl, propyl, isopropyl, butyl, isobutyl and tert-butyl, pentyl, hexyl, heptyl, octyl, nonyl and decyl.

More preferentially, the saturated linear or branched alkyl groups may be chosen from methyl, ethyl, propyl, isopropyl, butyl, isobutyl and tert-butyl, pentyl, hexyl, heptyl and octyl, such as methyl, ethyl, n-pentyl, n-nonyl, isobutyl.

a saturated hydrocarbonated cyclic C$_3$-C$_8$ group is a mono or bicyclic cycloalkyl group containing from 3 to 8 carbon atoms especially is a monocyclic cycloalkyl group in C$_5$ to C$_7$ such as cyclohexyl group, an "alkoxy radical" is an alkyl-oxy radical for which the alkyl radical is a linear or branched C$_1$-C$_{16}$ and preferentially C$_1$-C$_8$ hydrocarbon-based radical;

when the alkoxy group is optionally substituted, this implies that the alkyl group is optionally substituted as defined hereinabove;

an "aryl" group represents a fused or non-fused monocyclic or bicyclic carbon-based group comprising from 5 to 12 carbon atoms, preferably from 6 to 10 carbon atoms, and in which at least one ring is aromatic; preferentially, the aryl radical is a phenyl, biphenyl, naphthyl, more preferably a phenyl group;

the term "at least one" is equivalent to the term "one or more"; and the term "inclusive" for a range of concentrations means that the limits of that range are included in the defined range.

The salts of the compounds of formula (I), (I'), (II) or (II') as defined herein after comprise the conventional non-toxic salts of said compounds, such as those formed from organic or inorganic acid or from organic or inorganic base.

As salts of the compounds of formula (I), (I'), (II) or (II') mention may be made of:

the salts obtained by addition of the compound of formula (I) or (II) to a mineral base, such as sodium hydroxide, potassium hydroxide, calcium hydroxide, ammonium hydroxide, magnesium hydroxide, lithium hydroxide, and sodium, potassium or calcium carbonate or hydrogen carbonate for example; or an organic base such as a primary, secondary or tertiary alkylamine, for example triethylamine or butylamine. This primary, secondary or tertiary alkylamine may comprise one or more nitrogen and/or oxygen atoms and may thus comprise, for example, one or more alcohol functions; mention may be made in particular of 2-amino-2-methylpropanol, ethanolamine, triethanolamine, 2-dimethylaminopropanol, 2-amino-2-(hydroxymethyl)-1,3-propanediol and 3-(dimethylamino)propylamine.

Mention may also be made of the salts of amino acids, for instance lysine, arginine, guanidine, glutamic acid and aspartic acid. Advantageously, the salts of the compounds of formula (I) or (II) (when it comprises a carboxy group) may be chosen from alkali metal or alkaline-earth metal salts such as sodium, potassium, calcium or magnesium salts and ammonium salts.

as "organic or inorganic acid salt" is more particularly chosen from salts chosen from a salt derived from i) hydrochloric acid HCl, ii) hydrobromic acid HBr, iii) sulfuric acid H$_2$SO$_4$, iv) alkylsulfonic acids: Alk-S(O)$_2$OH such as methanesulfonic acid and ethanesulfonic acid; v) arylsulfonic acids: Ar—S(O)$_2$OH such as benzenesulfonic acid and toluenesulfonic acid; vi) citric acid; vii) succinic acid; viii) tartaric acid; ix) lactic acid; x) alkoxysulfinic acids: Alk-O—S(O)OH such as methoxysulfinic acid and ethoxysulfinic acid; xi) aryloxysulfinic acids such as tolueneoxysulfinic acid and phenoxysulfinic acid; xii) phosphoric acid $H_3PO_4$; xiii) acetic acid $CH_3C(O)OH$; xiv) triflic acid $CF_3SO_3H$; and xv) tetrafluoroboric acid $HBF_4$;

The acceptable solvates of the compounds described in the instant disclosure comprise conventional solvates such as those formed during the preparation of said compounds owing to the presence of solvents. Mention may be made, by way of example, of the solvates due to the presence of water or of linear or branched alcohols, such as ethanol or isopropanol.

The optical isomers are in particular, the enantiomers and the diastereoisomers.

The compounds used according to the instant disclosure therefore correspond to formula (I) or tautomer (I') below or their salts, their optical isomers, racemates, and/or solvates such as hydrates and the thereof, alone or as a mixture.

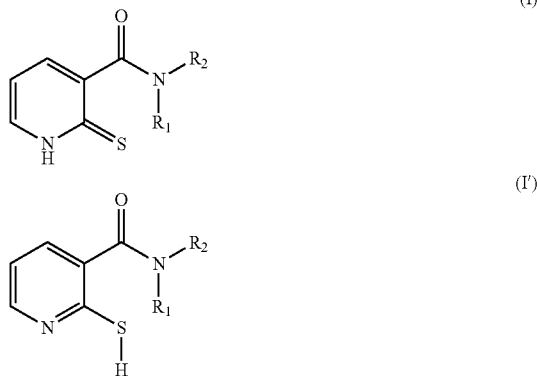

In which Formulas (I) and (I'):

$R_1$ denotes a radical chosen from:
a) a hydrogen atom;
b) a saturated linear $C_1$-$C_{10}$ or branched $C_3$-$C_{10}$ alkyl group optionally substituted with one or more groups, which may be identical or different, chosen from:
  i) —O—$R_3$
  ii) —S—$R_3$;

$R_2$ denotes a radical chosen from:
a) a hydrogen atom;
b) a saturated hydrocarbonated group linear $C_1$-$C_{12}$ or branched $C_3$-$C_{12}$ or cyclic $C_3$-$C_8$, optionally substituted with one or more groups, which may be identical or different, chosen from:
  i) —O—$R_3$
  ii) —S—$R_3$
  iii) —C(O)—O—$R_3$;
  iv) a $C_5$-$C_{12}$ aryl group optionally substituted with one or more hydroxyls and/or with one or more $C_1$-$C_8$ alkoxy radicals;
c) a $C_5$-$C_{12}$ aryl group optionally substituted with one or more hydroxyls and/or with one or more $C_1$-$C_8$ alkoxy radicals $R_3$ denotes a radical chosen from:
a) a hydrogen atom;
b) a saturated linear $C_1$-$C_{10}$ or branched $C_3$-$C_{10}$ alkyl group;

The compound (I') is the tautomer form of the compound (I) when a tautomeric equilibrium exists according to the following scheme:

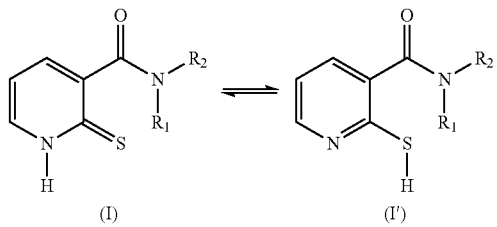

According to one embodiment of the disclosure $R_1$ represents one hydrogen atom.

According to another embodiment of the disclosure $R_1$ represents a linear ($C_1$-$C_{10}$)alkyl group or branched ($C_3$-$C_{10}$)alkyl group, especially a linear ($C_1$-$C_6$)alkyl group or branched ($C_3$-$C_6$)alkyl group, such as methyl, ethyl, n-pentyl, n-nonyl, isobutyl, more preferably ethyl. Particularly the said alkyl group of $R_1$ is not substituted.

According to one embodiment of the disclosure $R_2$ represents one hydrogen atom.

According to another embodiment of the disclosure $R_2$ represents a linear ($C_1$-$C_{10}$)alkyl group or branched ($C_3$-$C_{10}$)alkyl group, especially a linear ($C_1$-$C_6$)alkyl group or branched ($C_3$-$C_6$)alkyl group, such as methyl, ethyl, n-pentyl, n-nonyl, isobutyl, more preferably methyl or ethyl group; the said alkyl group of $R_2$ being not substituted.

According to another embodiment of the disclosure $R_2$ represents a linear ($C_1$-$C_{10}$)alkyl group or branched ($C_3$-$C_{10}$)alkyl group, especially a linear ($C_1$-$C_6$)alkyl group or branched ($C_3$-$C_6$)alkyl group, such as methyl, ethyl, n-pentyl, n-nonyl, isobutyl, more preferably methyl or ethyl; the said alkyl group being substituted by one or more groups selected from i), ii), iii) and iv) as defined herein before. Preferably the said alkyl group being substituted by one or two groups selected from i), ii) and iii), more preferably by one or two groups selected from i) and iii), better substituted by one group iii) as carboxy.

Another variant for radical $R_2$ is that the said alkyl group being substituted by one group iv) especially substituted by one phenyl group.

According to another embodiment of the disclosure $R_2$ represents a ($C_3$-$C_8$)cycloalkyl group, preferably a ($C_5$-$C_7$) cycloalkyl group such cyclohexyl.

According to another embodiment of the disclosure $R_2$ represents $C_5$-$C_{12}$ aryl group optionally substituted with one or more hydroxyls and/or with one or more $C_1$-$C_8$ alkoxy radicals, preferably a phenyl group particularly not substituted.

According to an embodiment $R_3$ represents a hydrogen atom.

According to another embodiment $R_3$ represents a saturated linear $C_1$-$C_{10}$ or branched $C_3$-$C_{10}$ alkyl group; particularly a linear ($C_1$-$C_6$)alkyl group or a branched ($C_3$-$C_6$)alkyl group, preferably ($C_1$-$C_4$)alkyl group such as methyl group.

Preferably, the compounds of formula (I) and tautomer (I') or their salts, their optical isomers, racemates, and/or solvates such as hydrates and the thereof, alone or as a mixture; have the following meanings:

$R_1$ denotes a radical chosen from:
a) a hydrogen atom;
b) a saturated linear $C_1$-$C_6$ or branched $C_3$-$C_6$ alkyl group optionally substituted with one or more groups, which may be identical or different, chosen from:
  i) —O—$R_3$
  ii) —S—$R_3$;

preferably optionally substituted with one or more groups i)

R$_2$ denotes a radical chosen from:
a) a hydrogen atom;
b) a saturated hydrocarbonated group linear C$_1$-C$_{10}$ or branched C$_3$-C$_{10}$ or cyclic C$_3$-C$_8$ such as C5-C6, optionally substituted with one or more groups, which may be identical or different, chosen from:
   i) —O—R$_3$
   ii) —SR-3
   iii) —C(O)—O—R$_3$;
   iv) a phenyl group optionally substituted with one or more hydroxyls and/or with one or more C$_1$-C$_4$ alkoxy radicals such as methoxy;
   preferably substituted with one or more groups selected from i) and iii), preferably iii) such as carboxy R$_3$ denotes a radical chosen from:
a) a hydrogen atom;
b) a saturated linear C$_1$-C$_6$ or branched C$_3$-C$_6$ alkyl group Preferentially, the compounds of formula (I) and tautomer (I') or their salts, their optical isomers, racemates, and/or solvates such as hydrates and the thereof, alone or as a mixture;
have the following meanings:
R$_1$ denotes a radical chosen from:
a) a hydrogen atom;
b) a saturated linear C$_1$-C$_4$ or branched C$_3$-C$_4$ alkyl group optionally substituted with one or more groups, which may be identical or different, chosen from i) —OR$_3$, more preferably not substituted;

R$_2$ denotes a radical chosen from:
a) a hydrogen atom;
b) a saturated hydrocarbonated group linear C$_1$-C$_{10}$ or branched C$_3$-C$_{10}$ or cyclic C$_3$-C$_8$ as C5-C6, optionally substituted with one or more groups, which may be identical or different, chosen from:
   i) —O—R$_3$
   iii) —C(O)—O—R$_3$;
   iv) a C$_5$-C$_{12}$ aryl group optionally substituted with one or more hydroxyls and/or with one or more C$_1$-C$_4$ alkoxy radicals;

R$_3$ denotes a radical chosen from:
a) a hydrogen atom;
b) a saturated linear C$_1$-C$_4$ or branched C$_3$-C$_4$ alkyl group such as methyl or ethyl.

Preferentially, the compounds of formula (I) and tautomer (I') or their salts, their optical isomers, racemates, and/or solvates such as hydrates and the thereof, alone or as a mixture;
have the following meanings:
R$_1$ is a hydrogen atom; and
R$_2$ denotes a radical chosen from:
a) a hydrogen atom;
b) a saturated hydrocarbonated group linear C$_1$-C$_5$ or branched C$_3$-C$_5$ or cyclic C$_3$-C$_8$ as C$_5$-C$_6$, substituted with one or more groups, which may be identical or different, chosen from v) —C(O)—O—R$_3$, preferably substituted with one group iii) —C(O)—O—R$_3$;

R$_2$ is even more preferably a saturated hydrocarbonated group linear C$_1$-C$_4$ or branched C$_3$-C$_4$ substituted with one group iii) —C(O)—OR$_3$.

According to another preferred embodiment, compounds of formula (I) and tautomer (I') are selected among compounds of formula (II) and also the tautomers thereof, the salts thereof, the solvates thereof and the optical isomers thereof, and the racemates thereof, alone or as a mixture:

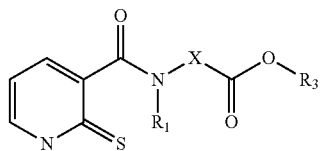

(II)

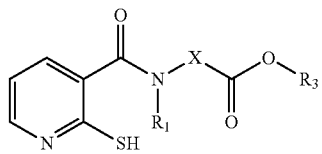

(II')

Formula (I) and (I') Wherein R1 and R3 have the same meaning than for compounds of formula (I) and (I') and X denotes an alkylene radical —(CH$_2$)$_n$— with n being an integer ranging inclusively from 1 to 10, preferably ranging from 1 to 6, more preferably ranging from 1 to 4, such as 1, preferably R$_3$ represents a hydrogen atom.

Among the compounds of formula (I), the following compounds are preferably used and their tautomer or their salts, their optical isomers, racemates, and/or solvates such as hydrates and the thereof, alone or as a mixture:

| No. | Structure | Chemical name | CAS No. |
|---|---|---|---|
| 1 | | N-ethyl-2-thioxo-1,2-dihydropyridine-3-carboxamide | 91859-75-5 |
| 2 | | N-methyl-2-thioxo-1,2-dihydropyridine-3-carboxamide | 91859-74-4 |

-continued

| No. | Structure | Chemical name | CAS No. |
|---|---|---|---|
| 3 | 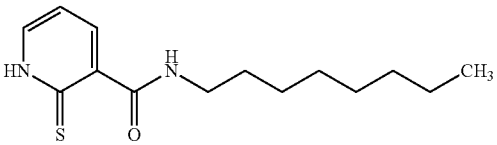 [SMILES: CCCCCCCCNC(=O)c1ccc[nH]c1=S] | N-octyl-2-thioxo-1,2-dihydropyridine-3-carboxamide | 91859-77-7 |
| 4 | 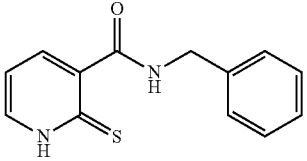 [SMILES: O=C(NCc1ccccc1)c1ccc[nH]c1=S] | N-benzyl-2-thioxo-1,2-dihydropyridine-3-carboxamide | 91859-79-9 |
| 5 | 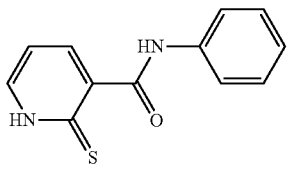 [SMILES: O=C(Nc1ccccc1)c1ccc[nH]c1=S] | N-phenyl-2-thioxo-1,2-dihydropyridine-3-carboxamide | 104857-16-1 |
| 6 | 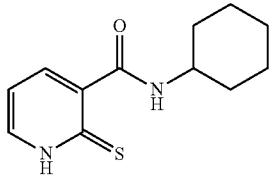 [SMILES: O=C(NC1CCCCC1)c1ccc[nH]c1=S] | N-cyclohexyl-2-thioxo-1,2-dihydropyridine-3-carboxamide | 91859-78-8 |
| 7 | 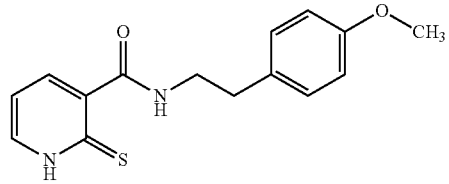 [SMILES: COc1ccc(CCNC(=O)c2ccc[nH]c2=S)cc1] | N-[2-(4-methoxyphenyl)ethyl]-2-thioxo-1,2-dihydropyridine-3-carboxamide | 923682-88-6 |
| 8 | 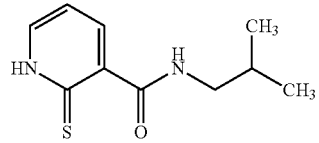 | N-(2-methylpropyl)-2-thioxo-1,2-dihydropyridine-3-carboxamide | 1100027-79-9 |
| 9 | 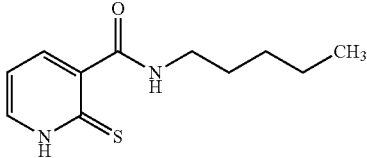 | N-pentyl-2-thioxo-1,2-dihydropyridine-3-carboxamide | 330667-57-7 |
| 10 | 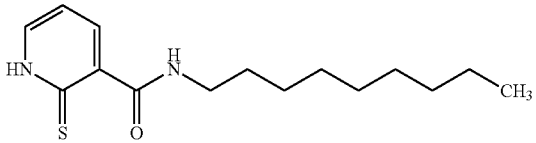 [SMILES: CCCCCCCCCNC(=O)c1ccc[nH]c1=S] | N-nonyl-2-thioxo-1,2-dihydropyridine-3-carboxamide | 1031149-44-6 |
| 11 | 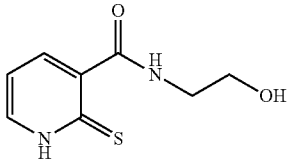 [SMILES: O=C(NCCO)c1ccc[nH]c1=S] | N-(2-hydroxyethyl)-2-thioxo-1,2-dihydropyridine-3-carboxamide N,N-diethyl 2-mercaptonicotinamide | |

| No. | Structure | Chemical name | CAS No. |
|---|---|---|---|
| 12 | | N,N-diethyl 2-mercaptonicotinamide | |
| 13 | | N-ethyl-N-(2-hydroxyethyl)-2-thioxo-1,2-dihydropyridine-3-carboxamide | |
| 14 | | N-(2,3-dihydroxypropyl)-2-thioxo-1,2-dihydropyridine-3-carboxamide | |
| 15 | | N-(1,3-dihydroxypropan-2-yl)-2-thioxo-1,2-dihydropyridine-3-carboxamide | |
| 16 | | Ethyl N-[(2-thioxo-1,2-dihydropyridin-3-yl)carbonyl]alaninate | |
| 17 | | Ethyl N-[(2-thioxo-1,2-dihydropyridin-3-yl)carbonyl]phenyl alaninate | |
| 18 | | Ethyl N-methyl-N-[(2-thioxo-1,2-dihydropyridin-3-yl)carbonyl]glycinate | |

-continued

| No. | Structure | Chemical name | CAS No. |
|---|---|---|---|
| 19 | | Ethyl N-[(2-thioxo-1,2-dihydropyridin-3-yl)carbonyl]glycinate | |
| 20 | | N-[(2-thioxo-1,2-dihydropyridin-3-yl)carbonyl]glycine | |
| 21 | | N-methyl-N-[(2-thioxo-1,2-dihydropyridin-3-yl)carbonyl]glycine | |
| 22 | | N,N-bis(2-hydroxyethyl)-2-thioxo-1,2-dihydropyridine-3-carboxamide | |
| 23 | | N-(3-methoxypropyl)-2-thioxo-1,2-dihydropyridine-3-carboxamide | |
| 24 | | N-butyl-2-thioxo-1,2-dihydropyridine-3-carboxamide | |

Among these compounds, the following compounds are more particularly preferred:

| No. | Structure | Chemical name | CAS No. |
|---|---|---|---|
| 1 | | N-ethyl-2-thioxo-1,2-dihydropyridine-3-carboxamide | 91859-75-5 |
| 2 | | N-methyl-2-thioxo-1,2-dihydropyridine-3-carboxamide | 91859-74-4 |

-continued

| No. | Structure | Chemical name | CAS No. |
|---|---|---|---|
| 4 | | N-benzyl-2-thioxo-1,2-dihydropyridine-3-carboxamide | 91859-79-9 |
| 6 | | N-cyclohexyl-2-thioxo-1,2-dihydropyridine-3-carboxamide | 91859-78-8 |
| 7 | | N-[2-(4-methoxyphenyl)ethyl]-2-thioxo-1,2-dihydropyridine-3-carboxamide | 923682-88-6 |
| 9 | | N-pentyl-2-thioxo-1,2-dihydropyridine-3-carboxamide | 330667-57-7 |
| 11 | | N-(2-hydroxyethyl)-2-thioxo-1,2-dihydropyridine-3-carboxamide | |
| 12 | | N,N-diethyl 2-mercaptonicotinamide | |
| 14 | | N-(2,3-dihydroxypropyl)-2-thioxo-1,2-dihydropyridine-3-carboxamide | |
| 15 | | N-(1,3-dihydroxypropan-2-yl)-2-thioxo-1,2-dihydropyridine-3-carboxamide | |

-continued

| No. | Structure | Chemical name | CAS No. |
|---|---|---|---|
| 16 | | Ethyl N-[(2-thioxo-1,2-dihydropyridin-3-yl)carbonyl]alaninate | |
| 17 | | Ethyl N-[(2-thioxo-1,2-dihydropyridin-3-yl)carbonyl]phenyl alaninate | |
| 18 | | Ethyl N-methyl-N-[(2-thioxo-1,2-dihydropyridin-3-yl)carbonyl]glycinate | |
| 19 | | Ethyl N-[(2-thioxo-1,2-dihydropyridin-3-yl)carbonyl]glycinate | |
| 20 | | N-[(2-thioxo-1,2-dihydropyridin-3-yl)carbonyl]glycine | |
| 21 | | N-methyl-N-[(2-thioxo-1,2-dihydropyridin-3-yl)carbonyl]glycine | |

More preferably, among these compounds, the following compounds are more particularly preferred:

| No. | Structure | Chemical name | CAS No. |
|---|---|---|---|
| 1 | | N-ethyl-2-thioxo-1,2-dihydropyridine-3-carboxamide | 91859-75-5 |

-continued

| No. | Structure | Chemical name | CAS No. |
|---|---|---|---|
| 9 | | N-pentyl-2-thioxo-1,2-dihydropyridine-3-carboxamide | 330667-57-7 |
| 16 | | Ethyl N-[(2-thioxo-1,2-dihydropyridin-3-yl) carbonyl]alaninate | |
| 18 | | Ethyl N-methyl-N-[(2-thioxo-1,2-dihydropyridin-3-yl)carbonyl]glycinate | |
| 19 | | Ethyl N-[(2-thioxo-1,2-dihydropyridin-3-yl) carbonyl]glycinate | |
| 20 | | N-[(2-thioxo-1,2-dihydropyridin-3-yl)carbonyl]glycine | |
| 21 | | N-methyl-N-[(2-thioxo-1,2-dihydropyridin-3-yl)carbonyl]glycine | |

Even more preferably, among these compounds, the following compounds are more particularly preferred:

| No. | Structure | Chemical name | CAS No. |
|---|---|---|---|
| 18 | | Ethyl N-methyl-N-[(2-thioxo-1,2-dihydropyridin-3-yl)carbonyl]glycinate | |

| No. | Structure | Chemical name | CAS No. |
|---|---|---|---|
| 19 | | Ethyl N-[(2-thioxo-1,2-dihydropyridin-3-yl)carbonyl]glycinate | |
| 20 | | N-[(2-thioxo-1,2-dihydropyridin-3-yl)carbonyl]glycine | |
| 21 | | N-methyl-N-[(2-thioxo-1,2-dihydropyridin-3-yl)carbonyl]glycine | |

In a most preferred embodiment, the compound according to the instant disclosure is the following:

| 20 | | N-[(2-thioxo-1,2-dihydropyridin-3-yl)carbonyl]glycine |
|---|---|---|

All compounds can be obtained by chemical method known by man skilled in the art, from commercially available reagents. We can for example use the synthetic method disclosed in the European patent application EP3 390 363.

The composition used according to the disclosure comprises at least one compound of formulae (I) and/or (II) as described above, in a physiologically acceptable medium.

The compound (I), (I'), (II) and/or (II') may be present in the composition used according to the disclosure in an amount which may be between 0.01% and 10% by weight, preferably between 0.1% and 5% by weight, in particular from 0.5% to 3% by weight, relative to the total weight of the composition.

A log P value is a value for the base-ten logarithm of the apparent octan-1-ol/water partition coefficient. The log p values are known and are determined by a standard test which determines the concentration of the (c) compound in octan-1-ol and water. The log P may be calculated according to the method described in the article by Meylan and Howard: Atom/Fragment contribution method for estimating octanol-water partition coefficients, J. Pharm. Sci., 84: 83-92, 1995. This value may also be calculated using numerous commercially available software packages, which determine the log P as a function of the structure of a molecule. By way of example, mention may be made of the Epiwin software from the United States Environmental Agency.

The values may especially be calculated using the ACD (Advanced Chemistry Development) Solaris software V4.67; they may also be obtained from Exploring QSAR: hydrophobic, electronic and steric constants (ACS professional reference book, 1995). There is also an Internet site which provides estimated values (address: http://esc.syrres.com/interkow/kowdemo.htm).

The composition may also include Vitamin B3 and derivatives.

Vitamin B3, also called vitamin PP, is a compound of the following formula:

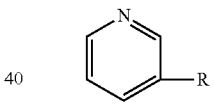

in which R may be —CONH2 (niacinamide), —COOH (nicotinic acid or niacin), or CH2OH (nicotinyl alcohol), —CO—NH—CH2-COOH (nicotinuric acid) or —CO—NH—OH (niconityl Polyglyceryl Fatty Acid Ester The composition according to the instant disclosure comprises one or more polyglyceryl fatty acid ester having an HLB value of 8.0 or more, preferably 8.5 or more, and more preferably 9.0 or more. A single type of polyglyceryl fatty acid ester may be used, but two or more different types of first polyglyceryl fatty acid ester may be used in combination.

The one or more polyglyceryl fatty acid ester may have an HLB value of from 8.0 to 20.0, preferably from 8.5 to 18, and more preferably from 9.0 to 14.0.

The term HLB ("hydrophilic-lipophilic balance") is well known to those skilled in the art and reflects the ratio between the hydrophilic part and the lipophilic part in the molecule.

The one or more polyglyceryl fatty acid ester may be chosen from mono, di, tri and more esters of saturated or unsaturated fatty acid(s).

It is preferable that the one or more polyglyceryl fatty acid ester comprises 2 to 4 glycerol units, preferably 3 or 4 glycerol units, and more preferably 4 glycerol units.

The fatty acid for the fatty acid moiety or the fatty acid moiety of the one or more polyglyceryl fatty acid ester may comprise 12 or fewer carbon atoms, preferably 11 or fewer carbon atoms, and more preferably 10 or fewer carbon atoms. The fatty acid for the fatty acid moiety or the fatty acid moiety of the one or more polyglyceryl fatty acid ester may comprise 4 or more carbon atoms, preferably 6 or more carbon atoms, and more preferably 8 or more carbon atoms. The fatty acid for the fatty acid moiety or the fatty acid moiety of the one or more polyglyceryl fatty acid ester may have carbon atoms of from 4 to 12, preferably from 6 to 11, and more preferably from 8 to 10 carbon atoms.

The fatty acid for the fatty acid moiety of the one or more polyglyceryl fatty acid ester may be saturated or unsaturated, and may be selected from caprylic acid, capric acid, and lauric acid.

The one or more polyglyceryl fatty acid ester(s) may be selected from the group consisting of PG3 caprate (HLB: about 14), PG4 caprylate (HLB: 14), PG4 laurate (HLB: about 14), PG4 caprate (HLB: 14), PG5 myristate (HLB: 15.4), PG5 stearate (HLB: 15), PG-5 oleate (HLB 11.5), PG6 caprylate (HLB: 14.6), PG6 caprate (HLB: 13.1), PG6 laurate (HLB: 14.1), PG10 laurate (HLB: 15.2), PG10 myristate (HLB: 14.9), PG10 stearate (HLB: 14.1), PG10 isostearate (HLB: 13.7), PG-10 diisostearate (HLB: 11), PG10 oleate (HLB: 13.0), PG10 cocoate (HLB: 16), and mixtures thereof.

It may be preferable that the one or more polyglyceryl fatty acid ester(s) be selected from the group consisting of PG3 caprate (HLB: about 14), PG4 caprylate (HLB: 14), PG4 laurate (HLB: about 14), PG4 caprate (HLB: 14), and mixtures thereof.

The one or more polyglyceryl fatty acid ester may be chosen from mono, di, tri and more esters of saturated or unsaturated fatty acid(s).

The fatty acid for the fatty acid moiety or the fatty acid moiety of the one or more polyglyceryl fatty acid ester may comprise 14 or more carbon atoms, preferably 16 or more carbon atoms, and more preferably 18 or more carbon atoms. The fatty acid for the fatty acid moiety or the fatty acid moiety of the one or more polyglyceryl fatty acid ester may comprise 30 or fewer carbon atoms, preferably 24 or fewer carbon atoms, and more preferably 20 or fewer carbon atoms. The fatty acid for the fatty acid moiety or the fatty acid moiety of the one or more polyglyceryl fatty acid ester may have from 14 to 30, preferably from 16 to 24, and more preferably from 18 to 20 carbon atoms.

The fatty acid for the fatty acid moiety of the one or more polyglyceryl fatty acid ester may be saturated or unsaturated, and may be selected from myristic acid, stearic acid, isostearic acid, and oleic acid.

The one or more polyglyceryl fatty acid ester(s) may be selected from the group consisting of PG2 sesquicaprylate (HLB: about 8), PG2 caprate (HLB: 9.5), PG2 laurate (HLB: 8.5), PG2 myristate (HLB: 10), PG2 isopalmitate (HLB: 9), PG4 oleate (HLB: 10), PG4 stearate (HLB: 9), PG4 isostearate (HLB: 8.2), PG6 distearate (HLB: 8), PG10 distearate (HLB: about 9), PG10 tristearate (HLB: 8), PG10 diisostearate (HLB: 10), PG10 triisostearate (HLB: 8), PG10 tricocoate (HLB: 9), and mixtures thereof.

It may be preferable that the one or more polyglyceryl fatty acid be selected from the group consisting of PG2 isostearate (HLB: 8), PG2 oleate (HLB: 8), PG2 sesquicaprylate (HLB: about 8), PG2 caprate (HLB: 9.5), PG2 laurate (HLB: 8.5), PG2 myristate (HLB: 10), PG2 isopalmitate (HLB: 9), PG4 oleate (HLB: 10), PG4 stearate (HLB: 9), PG4 isostearate (HLB: 8.2), and mixtures thereof.

As examples of the one or more polyglyceryl fatty acid ester, mention may be made of Sunsoft® Q-17D(G) from Taiyo Kagaku Co., Ltd., Sunsoft® A-121E-C from Taiyo Kagaku Co., Ltd., and Tegosoft® PC 41 from Evonik Co., Ltd.

The amount of the one or more polyglyceryl fatty acid ester(s) in the composition according to the Instant disclosure may be from about 0.5 to about 3 wt. % based on the total weight of the cosmetic composition.

The total the one or more polyglyceryl fatty acid ester(s) in the composition is typically in an amount of about 0.5, 0.6, 0.7, 0.8, 0.9, 1.0, 1.2, 1.4, 1.5 to about 1.5, 1.6, 1.8, 2.0, 2.2, 2.4, 2.6, 2.8, or 3.0 wt. %, based on the total weight of the composition.

Emulsifiers

In some embodiments, the cosmetic composition may include one or more emulsifiers.

Oil(s)

The cosmetic compositions include an oil phase comprising one or more oils. The amount of oil phase (e.g., the total amount of oils) is typically in 0.5 to 40 wt. %, based on the total weight of the cosmetic composition. In some instances, the cosmetic composition includes oils that are plant based or vegetable based oils.

The amount of oils present in the cosmetic composition may be from about 0.5 to about 40 wt. %, about 0.5 to about 38 wt. %, about 0.5 to about 34 wt. %, about 0.5 to about 32 wt. %; 0.5 to about 30 wt. %, 0.5 to about 28 wt. %, 0.5 to about 26 wt. %, 0.5 to about 24 wt. %, about 1 to about 40 wt. %, 1 to about 38 wt. %, 1 to about 36 wt. %, 1 to about 34 wt. %, 1 to about 32 wt. %, 1 to about 30 wt. %, 1 to about 28 wt. %, 1 to about 26 wt. %, 1 to about 24 wt. %, about 2 to about 40 wt. %, 2 to about 38 wt. %, 2 to about 36 wt. %, 2 to about 34 wt. %, 2 to about 32 wt. %, 2 to about 30 wt. %, 2 to about 28 wt. %, 2 to about 26 wt. %, 2 to about 24 wt. %, about 3 to about 40 wt. %, about 3 to about 38 wt. %, about 3 to about 36 wt. %, about 3 to about 34 wt. %, about 3 to about 32 wt. %, about 3 to about 30 wt. %, about 3 to about 28 wt. %, about 3 to about 26 wt. %, about 3 to about 24 wt %, about 4 to about 40 wt. %, about 3 to about 38 wt. %, about 4 to about 36 wt. %, about 4 to about 34 wt. %, about 4 to about 32 wt. %, about 4 to about 30 wt. %, about 4 to about 28 wt. %, about 4 to about 26 wt. %, about 5 to about 40 wt. %, about 5 to about 38 wt. %, about 5 to about 36 wt. %, about 5 to about 34 wt. %, about 5 to about 32 wt,%, about 5 to about 32 wt. %, about 5 to about 30 wt. %, about 5 to about 28 wt. %, about 5 to about 26 wt. %, or about 5 to about 24 wt. %, including all ranges and subranges therebetween, based on the total weight of the cosmetic composition.

Additionally and/or alternatively, the cosmetic composition may exclude synthetic oils. In some case, the cosmetic composition may exclude oils other than plant based and vegetable based oils. For example, the amount of synthetic oils and/or oils other than plant based and vegetable based oil may be about 5 wt. % or less, about 4 wt. % or less, about 3 wt. % or less, about 2 wt. % or less, about 1 wt. % or less, or about 0.5 wt. % or less, based on the total weight of the cosmetic composition. In at least one embodiment, the cosmetic composition is free of or essentially free of synthetic oils and/or oils other than plant based and vegetable based oil.

The term "oil" means any fatty substance which is in liquid form at room temperature (20-25° C.) and at atmospheric pressure (760 mmHg). Often, at least one of the oils in the cosmetic composition is part of an oily phase. An "oily phase" is a phase comprising at least one oil that may include additional liposoluble and lipophilic ingredients and the fatty substances. Oil that is suitable for use herein may be volatile or non-volatile. The term "volatile oil" relates to an oil that is capable of evaporating on contact with the skin or a keratin fiber in less than one hour, at room temperature and atmospheric pressure. Volatile oil(s) are liquid at room temperature and have a non-zero vapor pressure, at room temperature and atmospheric pressure, ranging in particular from 0.13 Pa to 40 000 Pa ($10^{-3}$ to 300 mmHg). The term "non-volatile oil" relates to an oil that remains on the skin or the keratin fiber, at room temperature and atmospheric pressure, for at least several hours and which in particular has a vapor pressure of less than $10^3$ mmHg (0.13 Pa).

pH Adjusting Agent

The composition according to the present invention may comprise at least one pH adjusting agent (pH adjuster). Two or more pH adjusting agents may be used in combination. Thus, a single type of pH adjusting agent or a combination of different types of pH adjusting agents may be used.

As the pH adjusting agent, at least one acidifying agent and/or at least one basifying agent (alkaline agent) may be used.

The acidifying agent may be a monovalent or polyvalent, such as divalent, acid.

The acidifying agents can be, for example, mineral (inorganic) acids such as hydrochloric acid, sulfuric acid, phosphoric acid, or organic acids such as carboxylic acids, for instance tartaric acid, citric acid, and lactic acid, as well as sulphonic acids.

The basifying agent may be a monovalent or polyvalent, such as divalent, base.

The basifying agents may be mineral (inorganic) or organic, or hybrid.

The mineral basifying agents may be chosen from aqueous ammonia; alkali metal carbonates or bicarbonates such as sodium or potassium carbonates and sodium or potassium bicarbonates; alkali metal hydroxides such as sodium hydroxide and potassium hydroxide; and mixtures thereof.

The organic basifying agents may be chosen from organic amines with a pKb at 25° C. of less than 12, preferably less than 10, and even more advantageously less than 6. It should be noted that it is the pKb corresponding to the function of highest basicity. In addition, the organic amines do not comprise any alkyl or alkenyl fatty chains comprising more than ten carbon atoms.

The organic basifying agent may be chosen, for example, from alkanolamines, oxyethylenated and/or oxypropylenated ethylenediamines, amino acids and amine compounds of formula (III) below:

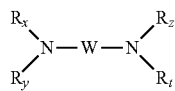

(III)

in which

W represents a $C_1$-$C_6$ divalent alkylene radical optionally substituted with one or more hydroxyl groups or a $C_1$-$C_6$ alkyl radical, and optionally interrupted with one or more heteroatoms such as O and N, and $R_x$, $R_y$, $R_z$, and $R_t$, which may be identical or different, represent a hydrogen atom or a $C_1$-$C_6$ alkyl, $C_1$-$C_6$ hydroxyalkyl, or $C_1$-$C_6$ aminoalkyl radical.

Examples of the amine compounds of formula (III) that may be mentioned include 1,3-diaminopropane, 1,3-diamino-2-propanol, spermine and spermidine.

The term "alkanolamine" means an organic amine comprising a primary, secondary or tertiary amine function, and one or more linear or branched $C_1$-$C_8$ alkyl groups bearing one or more hydroxyl radicals.

Alkanolamines such as monoalkanolamines, dialkanolamines or trialkanolamines comprising one to three identical or different $C_1$-$C_4$ hydroxyalkyl radicals may be suitable for the present invention. Among the compounds of this type, mention may be made of monoethanolamine (MEA), diethanolamine, triethanolamine, monoisopropanolamine, diisopropanolamine, N-dimethylaminoethanolamine, 2-amino-2-methyl-1-propanol, triisopropanolamine, 2-amino-2-methyl-1,3-propanediol, 3-amino-1,2-propanediol, 3-dimethylamino-1,2-propanediol and tris(hydroxymethylamino)methane.

Amino acids that may be used are of natural or synthetic origin, in their L, D or racemic form, and comprise at least one acid function chosen more particularly from carboxylic acid, sulfonic acid, phosphonic acid or phosphoric acid functions. The amino acids may be in neutral or ionic form.

As amino acids that may be used in the present invention, mention may be made especially of aspartic acid, glutamic acid, alanine, arginine, ornithine, citrulline, asparagine, carnitine, cysteine, glutamine, glycine, histidine, lysine, isoleucine, leucine, methionine, N-phenylalanine, proline, serine, taurine, threonine, tryptophan, tyrosine and valine.

It may be preferable that the amino acids are basic amino acids comprising an additional amine function optionally included in a ring or in an ureido function.

Such basic amino acids may preferably be chosen from those corresponding to formula (IV) below:

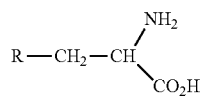

(IV)

in which
R represents a group chosen from:

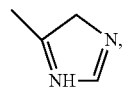

$(CH_2)_3$—$NH_2$,
$(CH_2)_2$—$NH_2$,
$(CH_2)_2$—NH—CO—$NH_2$, and

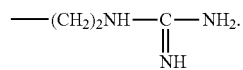

The compounds corresponding to formula (IV) include histidine, lysine, arginine, ornithine and citrulline.

The organic basifying agent may be chosen from organic amines of heterocyclic type. Besides histidine that has already been mentioned in the amino acids, mention may in particular be made of pyridine, piperidine, imidazole, triazole, tetrazole and benzimidazole.

The organic basifying agent may also be chosen from amino acid dipeptides. As amino acid dipeptides that may be used in the present invention, mention may be made especially of carnosine, anserine and baleine.

The organic basifying agent may also be chosen from compounds comprising a guanidine function. As amines of this type that may be used in the present invention, besides arginine, which has already been mentioned as an amino acid, mention may be made especially of creatine, creatinine, 1,1-dimethylguanidine, 1,1-diethyl-guanidine, glycocyamine, metformin, agmatine, N-amidinoalanine, 3-guanidino-propionic acid, 4-guanidinobutyric acid and 2-([amino(imino)methyl]amino)ethane-1-sulfonic acid.

In a preferred embodiment of the present invention, the organic basifying agent may be selected from amino acids, preferably basic amino acids, and more preferably arginine, lysine, histidine or mixtures thereof. Even more preferentially, the organic basifying agent may be arginine.

Hybrid compounds that may be mentioned include the salts of the amines mentioned previously with acids such as carbonic acid or hydrochloric acid. Guanidine carbonate or monoethanolamine hydrochloride may be used in particular.

The pH adjusting agent may be present in an amount of 0.01% by weight or more, preferably 0.05% by weight or more, and more preferably 0.1% by weight or more, relative to the total weight of the composition.

The pH adjusting agent may be present in an amount of 15% by weight or less, preferably 10% by weight or less, and more preferably 5% by weight or less, relative to the total weight of the composition.

The pH adjusting agent may be present in an amount ranging from 0.01% to 15% by weight, preferably from 0.05% to 10% by weight, and more preferably from 0.1% to 5% by weight or less, relative to the total weight of the composition.

It is preferable that the composition according to the present invention have a pH of 4.5 or more, and more preferably 5 or more.

It is preferable that the composition according to the present invention have a pH of 6.5 or less, and more preferably 6 or less.

It is preferable that the composition according to the present invention have a pH of from 4.5 to 6.5, and more preferably from 5 to 6.

The pH of the composition means the pH of the aqueous phase of the composition according to the present invention.

It may be preferable that at least one buffer or buffering agent also be used, as the pH adjusting agent, in combination with the acidifying agent and/or the basifying agent, in order to stabilize the pH of the composition according to the present invention.

As the buffer, any of commonly known buffers may be used. For example, salts of acids or bases, preferably salts of weak acids or weak bases, may be used. For example, sodium citrate or sodium lactate may be used as the buffer, if citric acid or lactic acid is used as the acidifying agent.

Cosmetically Acceptable Carrier System

The cosmetic compositions include a cosmetically acceptable carrier system. The term "cosmetically acceptable" means a carrier that is compatible with any keratinous substrate, and for purposes hereof, includes water and optionally water based solvents subject to any exclusions as disclosed herein.

The cosmetic compositions may comprise any constituent normally employed in the topical application and administration envisaged. Mention may in particular be made of water, solvents, polyols, fatty compounds (i.e. described by the International Federation Societies of Cosmetic Chemists, for example, in Cosmetic Raw Material Analysis and Quality, Volume I: Hydrocarbons, Glycerides, Waxes and Other Esters (Redwood Books, 1994), which is incorporated herein by reference in its entirety), pigments, fillers, silicones, surfactants, thickeners, gelling agents, preservatives and their mixtures in all proportions.

Form

The composition according to the instant disclosure is in the form of macroemulsion.

Macroemulsions are dispersed liquid-liquid, thermodynamically unstable systems with particle sizes ranging from 1 to 100 μm (orders of magnitude), which, most often, do not form spontaneously. Macroemulsions scatter light effectively and therefore appear milky, because their droplets are greater than a wavelength of light.[1] They are part of a larger family of emulsions along with miniemulsions (or nanoemulsions). As with all emulsions, one phase serves as the dispersing agent. It is often called the continuous or outer phase. The remaining phase(s) are disperse or inner phase(s), because the liquid droplets are finely distributed amongst the larger continuous phase droplets.[2] This type of emulsion is thermodynamically unstable, but can be stabilized for a period of time with applications of kinetic energy.[1] Surfactants (as the main emulsifiers) are used to reduce the interfacial tension between the two phases, and induce macroemulsion stability for a useful amount of time. Emulsions can be stabilized otherwise with polymers, solid particles (Pickering emulsions) or proteins.

The macroemulsion may have a dispersed phase with a particle size of no less than 600 nm total as minimum of range. Most likely in micron range, such as 0.8 to 20 microns. They do not form spontaneously (like microemulsions do).

The O/W architecture or structure, which consists of oil phases dispersed in an aqueous phase, has an external aqueous phase, and therefore if the composition according to the instant disclosure has the O/W architecture or structure, it can provide a pleasant feeling during use because of the feeling of immediate freshness that the aqueous phase can provide.

The particle size can be measured by a dynamic light scattering method. The particle size measurement can be performed by, for example, the Particle Size Analyzer ELSZ-2000 series, marketed by Otsuka Electronics Co., Ltd.

The particle size can be a volume-average particle diameter or a number-average particle diameter, preferably a volume-average particle diameter.

Methods of Use

The instant disclosure also relates to methods of using the cosmetic compositions described herein. For example, the cosmetic compositions can be used in a method that comprises applying the cosmetic compositions to the skin of humans. In some cases, the composition is applied to the face. Furthermore, the cosmetic composition can be used in methods for depigmenting, lightening and/or bleaching keratin materials, preferably skin, comprising the step of: applying to the keratin substance the composition according to the compositions described herein. The aforementioned methods are non-therapeutic.

The cosmetic composition may be applied once per day, twice per day, or more than once or twice per day. In some cases, the composition is applied in the evenings before bed. In other cases, the compositions are applied in the morning. In still other cases, the composition may be applied immediately after washing the skin. The compositions may be used once, or for a series of days, weeks, or months. For example, the compositions may be used daily for a period of 1, 2, 3, 4, 5, 6, 7, 8 or more weeks, or months.

The instant disclosure also relates to non-therapeutic cosmetic process for depigmenting, lightening and/or bleaching keratin materials, preferably skin, comprising the step of applying to the keratin substance the composition according to the compositions described herein.

Another aspect of the instant disclosure relates to a use of:
a. One or more Polyglyceryl Fatty Acid Ester;
for enhancing or improving the skin penetration of
b. Compound of thiopyridinone type;
in a composition in the form of a macroemulsion comprising:
c. One or more oils.

EXAMPLES

Implementation of the present disclosure is provided by way of the following examples. The following examples serve to elucidate aspects of the technology without being limiting in nature.

Example 1

Example 1: Synthesis of Compound 20

Compound 20 is synthesized as disclosed in example 2 of patent EP3 390 363.

Example 2

Inventive Compositions

The following compositions according to Inventive Examples 1-3, Base Formula and Comparative Examples 1-4 shown in Table 1 and 2, were prepared using the following general procedure.

Generally, the water-soluble raw materials (minus actives) were added to the main kettle and dissolved. Polymers were then added and mixed until well-dispersed. Batch was heated to 75° C. In a side kettle, the fatty compounds, silicones, and emulsifiers/surfactants were mixed together and heated to 75° C. The side kettle was added to the main kettle while homogenizing well. When well emulsified, the batch was cooled to room temperature, and actives and fillers were added.

TABLE 1

Inventive Compositions

| | INCI US | Inventive Ex. 1 | Inventive Ex. 2 | Inventive Ex. 3 |
|---|---|---|---|---|
| a | compound of Thiopyridinone type (THP) | 0.50 | 0.50 | 0.50 |
| | Niacinamide | 10.00 | 10.00 | 10.00 |
| b | Polyglyceryl-4 Caprate | 1.62 | 1.62 | 1.62 |
| | Emulsifiers | 2.5 | 3.5 | 3.61 |
| c | Oils | 12.3 | 12.4 | 12.4 |
| Polymer | Polymer | 1.37 | 1.37 | 1.37 |
| Filler | Filler | 0.40 | 0.40 | 0.40 |
| Chelating Agent | Chelating Agent | 0.11 | 0.11 | 0.11 |
| Active Compound | Active Compound | 1.40 | 1.40 | 1.40 |
| Vitamin | Vitamin | 0.25 | 0.25 | 0.25 |
| Ph Adjuster, Preservative | Ph Adjuster, Preservative | 1.50 | 1.50 | 1.50 |
| water-soluble solvents | water-soluble solvents | 11.21 | 11.21 | 11.23 |
| Water | Water | Q.S. | Q.S. | Q.S. |

TABLE 2

Comparative Compositions

| | INCI US | Base formula | Comp. Ex. 1 | Comp. Ex. 2 | Comp. Ex. 3 | Comp. Ex. 4 |
|---|---|---|---|---|---|---|
| | compound of Thipyridinone type (THP) | 0.50 | 0.50 | 0.50 | 0.50 | 0.50 |
| | Niacinamide | 10.00 | 10.00 | 10.00 | 10.00 | 10.00 |
| Emulsifiers | Emulsifiers | 2.5 | 2.5 | 2.5 | 2.61 | 4.3 |
| | Oils | 12.3 | 12.3 | 12.3 | 12.3 | 12.3 |
| Polymer | Polymers | 1.37 | 1.37 | 1.37 | 1.37 | 1.37 |
| filler | Filler | 0.40 | 0.40 | 0.40 | 0.40 | 0.40 |
| chelating agent | chelating agent | 0.11 | 0.11 | 0.11 | 0.11 | 0.11 |
| active compound | active compound | 1.40 | 1.40 | 1.40 | 1.40 | 1.40 |
| vitamin | vitamin | 0.25 | 0.25 | 0.25 | 0.25 | 0.25 |
| Water soluble solvent | Water soluble solvent | 11.21 | 11.21 | 14.21 | 11.23 | 11.21 |
| pH adjuster | pH adjuster | 1.5 | 1.5 | 1.5 | 1.5 | 1.5 |
| solvent | Water | Q.S. | Q.S. | Q.S. | Q.S. | Q.S. |

Example 3

Inventive Examples and Comparative Examples were tested to measure the enhanced penetration of the active ingredients. The enhanced penetration of the inventive and comparative Examples was assessed by following the procedure described below.

The penetration test experiments were performed in a Franz diffusion cell (Hanson) with a Strat-M membrane (Millipore, diameter of 15 mm). This equipment was composed of a donor part and a receptor part with the Strat-M membrane between the donor and receptor parts. The receptor part with a predetermined volume was filled with a receiving solution (0.25 wt. % Tween 80/deionized water) maintained at a temperature of 32° C., which was continuously stirred with a small magnetic bar. Each of the compositions according to Examples 1-3 and Comparative Examples 1-4 was spread with a spatula on the membrane of the donor part with an amount of 30 mg/cm2. After 5 hours, 200 μl of the receiving solution was withdrawn from the receptor part, while providing the same amount of a new receiving solution to the receptor part to maintain the same penetration conditions. The withdrawn receiving solution was analyzed by HPLC to determine the amount of the active ingredient in the receiving solution. The percentage of the active ingredient that passed through the membrane was calculated by dividing the detected amount of the active ingredient in the receiving solution by the amount of the active ingredient spread on the membrane. The amount of active in the cell was then plotted over time to determine the speed of diffusion through the membrane, as well as the total amount diffused after 24 hrs.

The goal of the study was to show that Polyglyceryl Fatty Acid Ester were able to enhance the penetration of the active ingredients in a traditional oil-in-water macroemulsion.

Several penetration enhancers were studied (i.e. Ethoxydiglycol, Dimethyl isosorbide, Sodium dilauramidoglutamide lysine as well as other raw materials that are not knowns to be penetration enhancers (i.e. Laureth-4 and polyglyceryl-4 caprate).

The results are shown in FIGS. 1, 2, 3, and 4.

Figure 2:
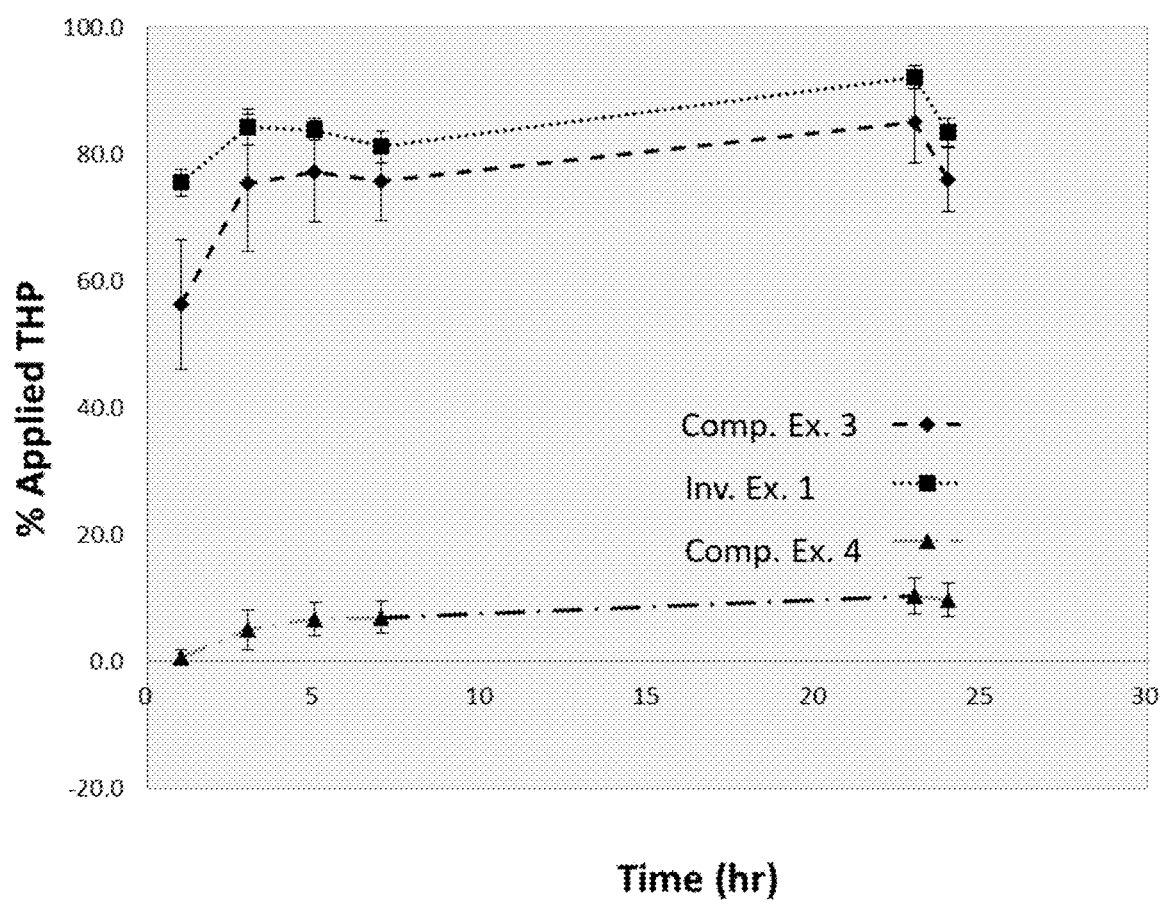
FIG. 2 is a graph showing the percentage of applied compound of thiopyridinone type (THP) penetration for Inventive and Comparative Examples.

FIG. 1 and FIG. 2 represented the percentage of the penetration of the thiopyridinone compound (i.e. THP) through the membrane over time.

The Base Formula started to penetrate through the membrane within the hour and kept increasing over time up to a plateau after 24 hours. The base formula did not contain any Polyglyceryl Fatty Acid Ester with a HLB from about 8 to about 20.

Comp. Ex. 1 and Comp. Ex. 2. showed that the penetration of the THP was slow as well at the beginning. In the case of Comp. Ex. 2, it was even observed that the penetration of the thiopyridinone compound was very limited over time. In the case of Comp. Ex. 1, the penetration increased slowly and reached a plateau as well, but still the penetration didn't reach the high level reached with the base formula. Both Comparative Example didn't contain any Polyglyceryl Fatty Acid Ester with a HLB from about 8 to about 20.

Comp. Ex. 4 showed a similar pattern as Comp. Ex. 2. The penetration of the thiopyridinone compound was slow and very limited. In the case of Comp. Ex. 3, the penetration was higher at the beginning, then reached a plateau. Both Comparative Example didn't contain any Polyglyceryl Fatty Acid Ester with a HLB from about 8 to about 20.

However, the Inventive Ex. 1 demonstrated that the penetration of the thiopyridinone compound was at about 78% at the beginning which was much higher than any of the Comp. Ex. Then, the penetration kept increasing and was above 80% after only few hours. The level of penetration was stable over 24 hours. The inventive example proved that the presence of a Polyglyceryl Fatty Acid Ester with a HLB from about 8 to about 20 not only increased the level of penetration of the active, but surprisingly, make it happened almost immediately after application of the products on the membrane.

These experiments surprisingly demonstrated that the use of at least one Polyglyceryl Fatty Acid Ester influence how fast the penetration of an active occurred through the membrane but simultaneously increased the % of penetration through the membrane.

Figure 3:
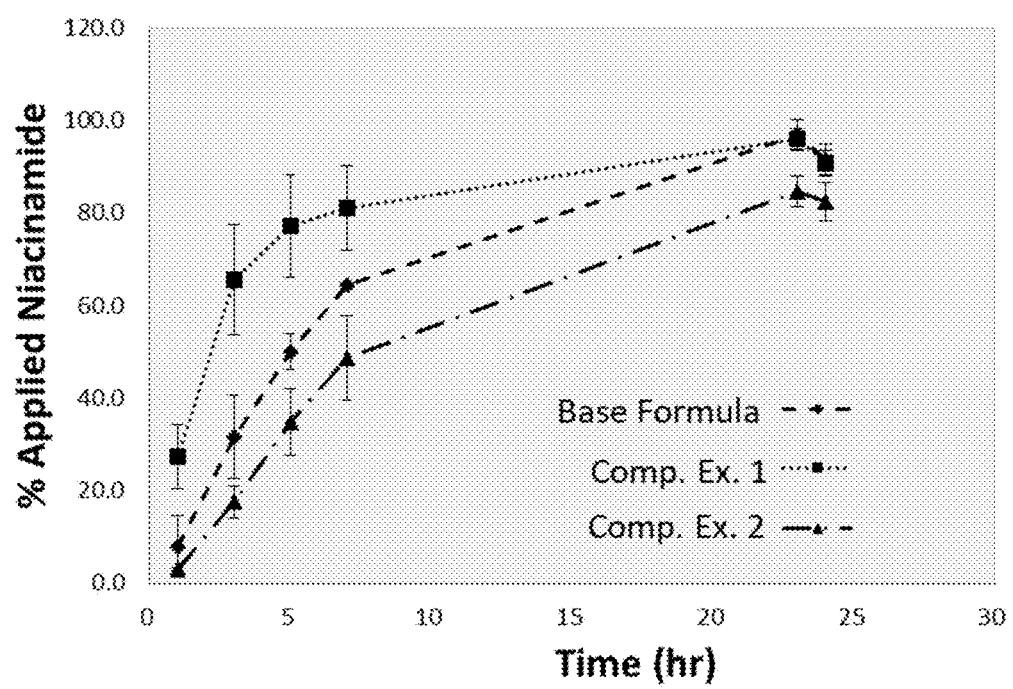
FIG. 3 is a graph showing the percentage of applied Niacinamide penetration for Base Formula and Comparative Examples.
Figure 4:
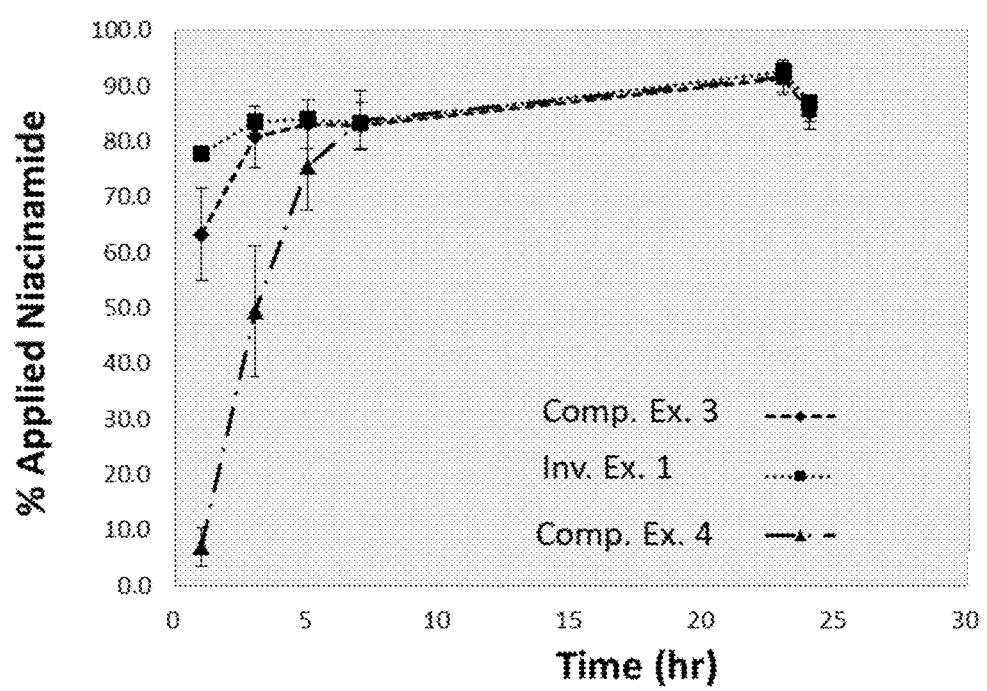
FIG. 4 is a graph showing the percentage of applied compound of thiopyridinone type (THP) penetration for Inventive and Comparative Examples.

FIG. 3 and FIG. 4 represented the percentage of the penetration of Niacinamide through the membrane over time.

The Base Formula started to penetrate through the membrane within the hour and kept increasing over time up to a plateau after 24 hours. The base formula did not contain any Polyglyceryl Fatty Acid Ester with a HLB from about 8 to about 20.

Comp. Ex. 1 and Comp. Ex. 2. showed that the penetration of Niacinamide was slow as well at the beginning. In the case of Comp. Ex. 2, it was even observed that the penetration of the THP was very limited over time. In the case of Comp. Ex. 1, the penetration increased slowly and reached a plateau as well, but still the penetration didn't reach the high level reached with the base formula. All Comparative Example didn't contain any Polyglyceryl Fatty Acid Ester with a HLB from about 8 to about 20.

Comp. Ex. 4 showed a similar pattern as Comp. Ex. 2. The penetration of the niacinamide was slow and very limited. In the case of Comp. Ex. 3, the penetration was higher at the beginning, then reached a plateau. All Comparative Examples didn't contain any Polyglyceryl Fatty Acid Ester with a HLB from about 8 to about 20.

However, the Inventive Ex. 1 demonstrated that the penetration of niacinamide was at about 78% at the beginning which was much higher than any of the Comp. Ex. Then, the penetration kept increasing and was above 80% after only few hours. The level of penetration was stable over 24 hours. The inventive example proved that the presence of a Polyglyceryl Fatty Acid Ester with a HLB from about 8 to about 20 not only increased the level of penetration of the active, but surprisingly, make it happened almost immediately after application of the products on the membrane.

These experiments surprisingly demonstrated that the use of at least one Polyglyceryl Fatty Acid Ester influence how fast the penetration of an active occurred through the membrane and simultaneously increased the % of penetration through the membrane and potentially through the human skin.

The comparison of Inventive Ex. and comparative Ex. 1, 2, 3, 4 as well as the Base Formula surprisingly demonstrated that the use of at least one Polyglyceryl Fatty Acid Ester enhanced the penetration of THP as compared to when the Polyglyceryl Fatty Acid Ester is not present, even though the comparative Examples contained known penetration enhancers, such as Ethoxydiglycol, Dimethyl isosorbide, Sodium dilauramidoglutamide lysine. The penetration is better than with the known penetration enhancers.

While the disclosure has been described with reference to described embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The term "INCI" is an abbreviation of International Nomenclature of Cosmetic Ingredients, which is a system of names provided by the International Nomenclature Committee of the Personal Care Products Council to describe personal care ingredients.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

The terms "free" and "devoid" indicates that no reliably measurable excluded material is present in the composition, typically 0% by weight, based on the total weight of the composition. The term "essentially free" means that, while it prefers that no excluded material is present in the composition, it is possible to have very small amounts of the excluded material in the composition of the invention, provided that these amounts do not materially affect the advantageous properties of the composition. In particular, "essentially free" means that excluded material can be present in the composition at an amount of less than about 0.1% by weight, based on the total weight of the composition.

Other than in the operating examples, or where otherwise indicated, all numbers expressing quantities of ingredients and/or reaction conditions are to be understood as being modified in all instances by the term "about," meaning within 10% of the indicated number (e.g. "about 10%" means 9%-11% and "about 2%" means 1.8%-2.2%).

All percentages and ratios are calculated by weight unless otherwise indicated. All percentages are calculated based on the total composition unless otherwise indicated. Generally, unless otherwise expressly stated herein, "weight" or "amount" as used herein with respect to the percent amount of an ingredient refers to the amount of the raw material comprising the ingredient, wherein the raw material may be described herein to comprise less than and up to 100% activity of the ingredient. Therefore, weight percent of an active in a composition is represented as the amount of raw material containing the active that is used, and may or may not reflect the final percentage of the active, wherein the final percentage of the active is dependent on the weight percent of active in the raw material.

The terms "weight percent" and "wt %" may be used interchangeably and mean percent by weight, based on the total weight of a composition, article or material, except as may be specified with respect to, for example, a phase, or a system that is a component of a composition, article or material. All ranges and amounts given herein are intended to include subranges and amounts using any disclosed point as an end point. Thus, a range of "1% to 10%, such as 2% to 8%, such as 3% to 5%," is intended to encompass ranges of "1% to 8%," "1% to 5%," "2% to 10%," and so on. All numbers, amounts, ranges, etc., are intended to be modified by the term "about," whether or not so expressly stated. Similarly, a range given of "about 1% to 10%" is intended to have the term "about" modifying both the 1% and the 10% endpoints. Further, it is understood that when an amount of a component is given, it is intended to signify the amount of the active material unless otherwise specifically stated.

Notwithstanding that the numerical ranges and parameters setting forth the broad scope of the disclosure are approximations, unless otherwise indicated the numerical values set forth in the specific examples are reported as precisely as possible. Any numerical value, however, inherently contains certain errors necessarily resulting from the standard deviation found in their respective testing measurements. The example that follows serves to illustrate embodiments of the present disclosure without, however, being limiting in nature.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

The invention claimed is:
1. An oil-in-water cosmetic composition comprising:
   I) at least one compound selected from a compound of formula (I), a tautomer of formula (I'), their salts, their optical isomers, racemates, solvates, or a mixture thereof:

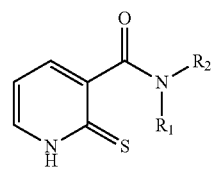

(I)

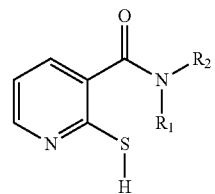

(I')

wherein Formulas (I) and (I'):
  $R_1$ denotes a radical chosen from:
   a) a hydrogen atom; or
   b) a saturated linear $C_1$-$C_{10}$ or branched $C_3$-$C_{10}$ alkyl group optionally substituted with one or more groups, which may be identical or different, chosen from:
    i) —O—$R_3$, or
    ii) —S—$R_3$;
  $R_2$ denotes a radical chosen from:
   a) a hydrogen atom;
   b) a saturated hydrocarbonated group linear $C_1$-$C_{12}$ or branched $C_3$-$C_{12}$ or cyclic $C_3$-$C_8$, optionally substituted with one or more groups, which may be identical or different, chosen from:
    i) —O—$R_3$,
    ii) —S—$R_3$,
    iii) —C(O)—O—$R_3$; or
    iv) a $C_5$-$C_{12}$ aryl group optionally substituted with one or more hydroxyls and/or with one or more $C_1$-$C_8$ alkoxy radicals, and
  $R_3$ denotes a radical chosen from:
   a) a hydrogen atom, or
   b) a saturated linear $C_1$-$C_{10}$ or branched $C_3$-$C_{10}$ alkyl group;
 II) one or more polyglyceryl fatty acid esters selected from the group consisting of polyglyceryl-4 caprate, polyglyceryl-6 dicaprate, polyglyceryl-6 dioleate, polyglyceryl-6 distearate, and mixtures thereof; and
 III) one or more oils; and
wherein the penetration of the at least compound of item I) is improved through the use of one or more polyglyceryl fatty acid esters;
wherein the pH is from about 4.5 to about 6.5; and
wherein the oil-in-water cosmetic composition is a macroemulsion.

2. The composition of claim 1 in which radical:
 $R_1$ of formula (I) and (I') represents a hydrogen atom,
or
 $R_1$ of formula (I) and (I') represents a linear $C_1$-$C_{10}$ alkyl group or branched $C_3$-$C_{10}$ alkyl group.

3. The composition of claim 1 in which:
 $R_2$ of formula (I) and (I') represents a hydrogen atom;
or
 $R_2$ of formula (I) and (I') represents a linear $C_1$-$C_{10}$ alkyl group or branched $C_3$-$C_{10}$ alkyl group.

4. The composition of claim 1 in which radical:
 $R_2$ of formula (I) or (I') represents a linear $C_1$-$C_{10}$ alkyl group or branched $C_3$-$C_{10}$ alkyl group, being substituted by one or more groups selected from i), ii), iii), and iv) as defined in claim 1.

5. The composition of claim 1 in which radical:
 $R_2$ of formula (I) and (I') represents a $C_3$-$C_8$ cycloalkyl group;
or
 $R_2$ of formula (I) and (I') represents a $C_5$-$C_{12}$ aryl group optionally substituted with one or more hydroxyls and/or with one or more $C_1$-$C_8$ alkoxy radicals.

6. The composition of claim 1 in which:
 $R_1$ of formula (I) and (I') represents a radical chosen from:
  a) a hydrogen atom; or
  b) a saturated linear $C_1$-$C_6$ or branched $C_3$-$C_6$ alkyl group optionally substituted with one or more groups, which may be identical or different, chosen from:
   i) —O—$R_3$, or
   ii) —S—R;
 $R_2$ of formula (I) and (I') represents a radical chosen from:
  a) a hydrogen atom; or
  b) a saturated hydrocarbonated group linear $C_1$-$C_{10}$ or branched $C_3$-$C_{10}$ or cyclic $C_3$-$C_8$, optionally substituted with one or more groups, which may be identical or different, chosen from:
   i) —O—$R_3$
   ii) —SR-$_3$,
   iii) —C(O)—O—$R_3$; or
   iv) a phenyl group optionally substituted with one or more hydroxyls and/or with one or more $C_1$-$C_4$ alkoxy radicals;
 $R_3$ of formula (I) and (I') represents a radical chosen from:
  a) a hydrogen atom; or
  b) a saturated linear $C_1$-$C_6$ or branched $C_3$-$C_6$ alkyl group.

7. The composition of claim 1 in which one or more compounds of formula (I), are one or more of compounds 1 to 24, their tautomers, salts, optical isomers, racemates, solvates or a mixture thereof:

| No. | Structure | Chemical name |
|-----|-----------|---------------|
| 1 | | N-ethyl-2-thioxo-1,2-dihydropyridine-3-carboxamide |
| 2 | | N-methyl-2-thioxo-1,2-dihydropyridine-3-carboxamide |
| 3 | | N-octyl-2-thioxo-1,2-dihydropyridine-3-carboxamide |

-continued

| No. | Structure | Chemical name |
|---|---|---|
| 4 | | N-benzyl-2-thioxo-1,2-dihydropyridine-3-carboxamide |
| 5 | | N-phenyl-2-thioxo-1,2-dihydropyridine-3-carboxamide |
| 6 | | N-cyclohexyl-2-thioxo-1,2-dihydropyridine-3-carboxamide |
| 7 | | N-[2-(4-methoxyphenyl)ethyl]-2-thioxo-1,2-dihydropyridine-3-carboxamide |
| 8 | | N-(2-methylpropyl)-2-thioxo-1,2-dihydropyridine-3-carboxamide |
| 9 | | N-pentyl-2-thioxo-1,2-dihydropyridine-3-carboxamide |
| 10 | | N-nonyl-2-thioxo-1,2-dihydropyridine-3-carboxamide |
| 11 | | N-(2-hydroxyethyl)-2-thioxo-1,2-dihydropyridine-3-carboxamide |
| 12 | | N,N-diethyl 2-mercaptonicotinamide |

-continued

| No. | Structure | Chemical name |
|---|---|---|
| 13 | | N-ethyl-N-(2-hydroxyethyl)-2-thioxo-1,2-dihydropyridine-3-carboxamide |
| 14 | | N-(2,3-dihydroxypropyl)-2-thioxo-1,2-dihydropyridine-3-carboxamide |
| 15 | | N-(1,3-dihydroxypropan-2-yl)-2-thioxo-1,2-dihydropyridine-3-carboxamide |
| 16 | | Ethyl N-[(2-thioxo-1,2-dihydropyridin-3-yl)carbonyl]alaninate |
| 17 | | Ethyl N-[(2-thioxo-1,2-dihydropyridin-3-yl)carbonyl]phenyl alaninate |
| 18 | | Ethyl N-methyl-N-[(2-thioxo-1,2-dihydropyridin-3-yl)carbonyl]glycinate |
| 19 | | Ethyl N-[(2-thioxo-1,2-dihydropyridin-3-yl)carbonyl]glycinate |
| 20 | | N-[(2-thioxo-1,2-dihydropyridin-3-yl)carbonyl]glycine |

| No. | Structure | Chemical name |
|---|---|---|
| 21 | | N-methyl-N-[(2-thioxo-1,2-dihydropyridin-3-yl)carbonyl]glycine |
| 22 | | N,N-bis(2-hydroxyethyl)-2-thioxo-1,2-dihydropyridine-3-carboxamide |
| 23 | | N-(3-methoxypropyl)-2-thioxo-1,2-dihydropyridine-3-carboxamide |
| 24 | | N-butyl-2-thioxo-1,2-dihydropyridine-3-carboxamide. |

8. The composition of claim 1, further comprising niacinamide.

9. The composition of claim 1, wherein the at least one compound of item I) is present from about 0.01 to about 10 wt. %, based on the total weight of the cosmetic composition.

10. The composition of claim 1, wherein the one or more polyglyceryl fatty acid esters is present from about 0.5 to about 3 wt. %, based on the total weight of the cosmetic composition.

11. The composition of claim 1, wherein the oil phase is present from about 2 to about 25 wt. %, based on the total weight of the cosmetic composition.

12. An oil-in-water cosmetic composition comprising:
I) from about 0.01 to about 10 wt. % of at least one compound selected from a compound of formula (I), a tautomer of formula (I'), their salts, their optical isomers, racemates, solvates, or a mixture thereof:

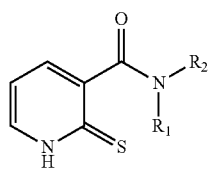
(I)

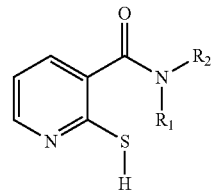
(I')

wherein Formulas (I) and (I'):
R$_1$ denotes a radical chosen from:
c) a hydrogen atom; or
d) a saturated linear C$_1$-C$_{10}$ or branched C$_3$-C$_{10}$ alkyl group optionally substituted with one or more groups, which may be identical or different, chosen from:
v) —O—R$_3$, or
vi) —S—R$_3$;
R$_2$ denotes a radical chosen from:
a) a hydrogen atom;
b) a saturated hydrocarbonated group linear C$_1$-C$_{12}$ or branched C$_3$-C$_{12}$ or cyclic C$_3$-C$_8$, optionally substituted with one or more groups, which may be identical or different, chosen from:
i) —O—R$_3$,
ii) —S—R$_3$,
vii) —C(O)—O—R$_3$; or
viii) a C$_5$-C$_{12}$ aryl group optionally substituted with one or more hydroxyls and/or with one or more C$_1$-C$_8$ alkoxy radicals, and R$_3$ denotes a radical chosen from:
c) a hydrogen atom, or
d) a saturated linear C$_1$-C$_{10}$ or branched C$_3$-C$_{10}$ alkyl group;

II) about 0.5 to about 3 wt. % of one or more polyglyceryl fatty acid esters selected from the group consisting of polyglyceryl-4 caprate, polyglyceryl-6 dicaprate, polyglyceryl-6 dioleate, polyglyceryl-6 distearate, and mixtures thereof; and III) one or more oils; and wherein the penetration of the at least compound of item I) is improved through the use of one or more polyglyceryl fatty acid esters;

wherein the oil-in-water cosmetic composition is a macroemulsion;

wherein the pH is from about 4.5 to about 6.5; and wherein the weight percentages are based on the total weight of the cosmetic composition.

13. A method of using the cosmetic composition of claim 1 or 12, comprising applying the cosmetic composition of claim 1 or 12 to a skin surface, wherein the cosmetic composition of claim 1 or 12 provides enhanced penetration of the at least one compound of item I) as in claim 1 or 12.

14. A non-therapeutic cosmetic process for depigmenting, lightening and/or bleaching keratin materials, comprising the step of: applying to the keratin substance the composition according to claim 1, 2, 3, 4, 5, 6, 7, 8, 9, 10, 11, or 12.

15. The composition of claim 1 wherein one or more compounds of formula (I) is compound 20:

| No. | Structure | Chemical name |
|---|---|---|
| 20 | (structure) | N-[(2-thioxo-1,2-dihydropyridin-3-yl)carbonyl]glycine. |

* * * * *